(12) United States Patent
Muenzner et al.

(10) Patent No.: US 12,386,059 B2
(45) Date of Patent: Aug. 12, 2025

(54) METHOD FOR MONITORING SURROUNDINGS OF A FIRST SENSOR SYSTEM

(71) Applicant: Robert Bosch GmbH, Stuttgart (DE)

(72) Inventors: Sebastian Muenzner, Ludwigsburg (DE); Alexandru Paul Condurache, Renningen (DE); Claudius Glaeser, Ditzingen (DE); Fabian Timm, Renningen (DE); Florian Drews, Renningen (DE); Florian Faion, Staufen (DE); Jasmin Ebert, Heidelberg (DE); Lars Rosenbaum, Lahntal (DE); Michael Ulrich, Stuttgart (DE); Rainer Stal, Zurich (CH); Thomas Gumpp, Dillingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 282 days.

(21) Appl. No.: 18/246,144

(22) PCT Filed: Nov. 3, 2021

(86) PCT No.: PCT/EP2021/080460
§ 371 (c)(1),
(2) Date: Mar. 21, 2023

(87) PCT Pub. No.: WO2022/101063
PCT Pub. Date: May 19, 2022

(65) Prior Publication Data
US 2023/0358879 A1  Nov. 9, 2023

(30) Foreign Application Priority Data
Nov. 10, 2020 (DE) ............. 10 2020 214 123.1

(51) Int. Cl.
*G01S 13/86* (2006.01)
*G06V 20/58* (2022.01)

(52) U.S. Cl.
CPC .......... *G01S 13/867* (2013.01); *G01S 13/865* (2013.01); *G06V 20/58* (2022.01)

(58) Field of Classification Search
None
See application file for complete search history.

(56) References Cited

U.S. PATENT DOCUMENTS

2019/0147610 A1\* 5/2019 Frossard ............... G06N 3/045
                                                            382/103
2019/0258878 A1\* 8/2019 Koivisto ............... G06V 10/46
(Continued)

FOREIGN PATENT DOCUMENTS

| DE | 102013201545 A1 | 7/2014 |
| DE | 102017215718 A1 | 3/2019 |
| DE | 102018121866 A1 | 3/2020 |

OTHER PUBLICATIONS

International Search Report for PCT/EP2021/080460, Issued Feb. 11, 2022.
(Continued)

*Primary Examiner* — Bernarr E Gregory
(74) *Attorney, Agent, or Firm* — NORTON ROSE FULBRIGHT US LLP

(57) ABSTRACT

A method for monitoring surroundings of a first sensor system. The method includes: providing a temporal sequence of data of the first sensor system for monitoring the surroundings; generating an input tensor including the temporal sequence of data of the first sensor system, for a trained neural network; the neural network being configured and trained to identify, on the basis of the input tensor, at least one subregion of the surroundings, in order to improve the monitoring of the surroundings with the aid of a second
(Continued)

sensor system; generating a control signal for the second sensor system with the aid of an output signal of the trained neural network, in order to improve the monitoring of the surroundings in the at least one subregion.

15 Claims, 5 Drawing Sheets

(56) References Cited

U.S. PATENT DOCUMENTS

| | | | |
|---|---|---|---|
| 2019/0384303 A1* | 12/2019 | Muller | G06N 20/00 |
| 2021/0026355 A1* | 1/2021 | Chen | G01S 17/89 |
| 2021/0150230 A1* | 5/2021 | Smolyanskiy | G06V 10/82 |
| 2021/0156963 A1* | 5/2021 | Popov | G06N 3/045 |

OTHER PUBLICATIONS

Cheng et al., "Geometry-Aware Recurrent Neural Networks for Active Visual Recognition," 32nd Conference on Neural Information Processing Systems (NEURIPS 2018), 2018, pp. 1-11. <https://proceedings.neurips.cc/paper/2018/file/8c9f32e03aeb2e3000825c8c875c4edd-Paper.pdf> Downloaded Mar. 20, 2023.

Chen et al., "VERAM: View-Enhanced Recurrent Attention Model for 3D Shape Classification," Journal of IEEE Transactions on Visualization and Computer Graphics, IEEE, vol. 25, No. 12, 2019, pp. 1-14. <https://arxiv.org/pdf/1808.06698.pdf> Downloaded Mar. 20, 2023.

Jayaraman et al., "Look-Ahead Before You Leap: End-to-End Active Recognition by Forecasting the Effect of Motion," Proceedings of the European Conference on Computer Vision (ECCV), 2016, pp. 1-17. <https://www.cs.utexas.edu/users/grauman/papers/jayaraman-eccv2016-activerec.pdf> Downloaded Mar. 20, 2023.

Nguyen, et al.: "ROI—Based LiDAR Sampling Algorithm in on-Road Environment for Autonomous Driving," IEEE Access (2019), vol. 7, pp. 90243-90253.

SATO Ministry, ITS-advanced traffic system Part II, vol. 16, No. 1, Japan, Nihon Kogyo Publishing Co., Ltd., 2005, vol. 16, vol. 01, pp. 45-51, 3 Image Lab.—copy not available, see Japanese Office Action.

Office Action issued by JPO on Apr. 9, 2024 in corresponding patent appication No. 2023-527673—English Translation.

* cited by examiner

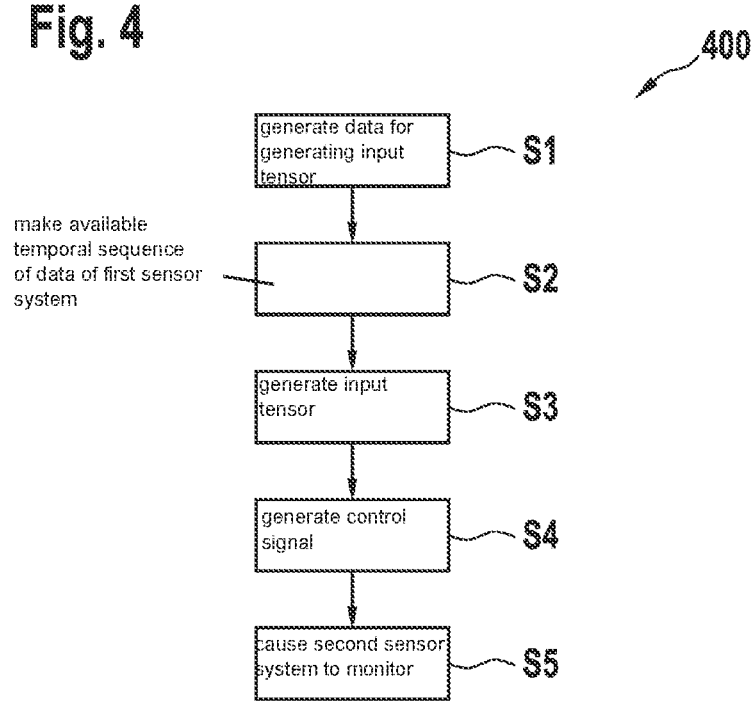
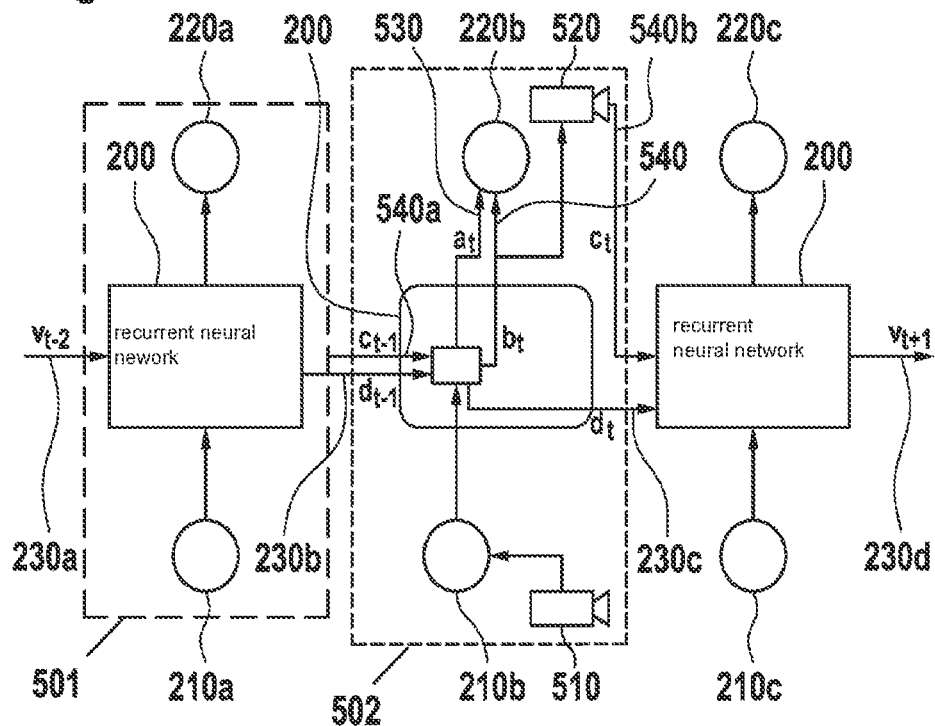

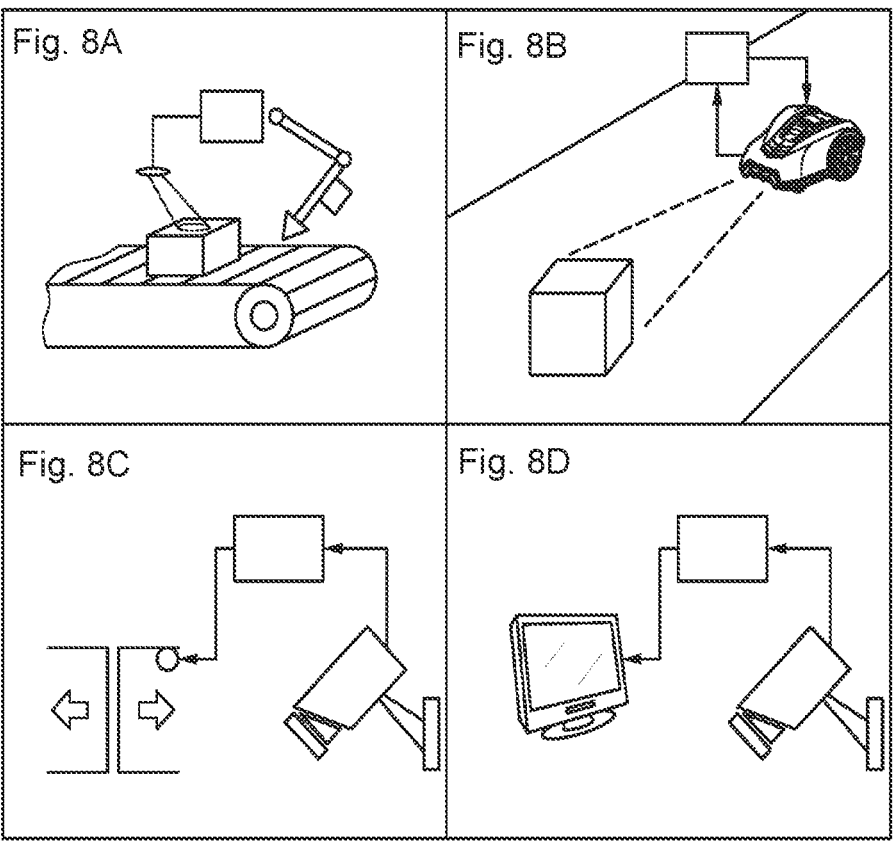

METHOD FOR MONITORING SURROUNDINGS OF A FIRST SENSOR SYSTEM

BACKGROUND INFORMATION

The automation of driving is accompanied by the equipping of vehicles with more and more extensive and powerful sensor systems for monitoring surroundings and for supporting driving functions and/or for controlling and guiding the vehicle in an at least semiautomated manner.

To that end, several different types of sensors, that is, sensors based on different technologies, are often used, for example, radar sensors and video sensors. Initially, the data, which are generated by the specific, different types of sensors, are typically processed individually, independently from each other; that is, the received radar waves are processed independently from the optical sensors. The data are only combined or settled in the later processing steps, for example, by associating radar reflections and video pixels or merging computed radar and video objects; and in more highly integrated systems, the sensors measure independently from each other, as well.

A video camera transmits, for example, its images to a monitoring device, and a radar sensor transmits its signals to this monitoring device, as well.

SUMMARY

If a video camera is considered a non-controllable sensor system for assisted or automated driving, which continually detects the entire scene as much as possible, then it is comparable to the visual perception of a driver of a mobile platform. However, a driver uses inside and outside mirrors, as well, in order to monitor the entire surroundings of the vehicle, and at dusk or at night, further auxiliary devices, such as dimmed headlights or high beams, are used for more effective visual perception.

In this context, during driving, increased attention of the driver is more local, that is, sharp vision and the corresponding processing in the brain takes place primarily in the forward direction. At the periphery, however, a human being processes mainly movements. Consequently, the driver directs his/her vision and attention actively and situationally to the relevant regions of the surroundings; an individual driver is not able to monitor the entire 360° field visually at all times.

Systems for assisting a driver or for driving in an automated manner may improve a corresponding, selective utilization and active combination of a plurality of sensors similar to human perception (scan and watch), in particular, during the use of different types of sensors.

Aspects of the present invention provide a method for monitoring surroundings of a first sensor system, a method for training a neural network, a neural network, and a monitoring device. Advantageous refinements and example embodiments of the present invention are disclosed herein.

In this entire description of the present invention, the sequence of method steps is shown in such a manner, that the method is easily reproducible. However, one skilled in the art will recognize that many of the method steps may also be executed in a different order and produce the same or a comparable result. Along these lines, the order of the method steps may be modified accordingly. Some features are provided with numerals, in order to improve the legibility or to make the association clearer. However, this does not imply the presence of certain features.

According to one aspect of the present invention, a method for monitoring surroundings of a first sensor system is provided. According to an example embodiment of the present invention, the method including the following steps:

In one step, a temporal sequence of data of the first sensor system for monitoring the surroundings is provided. In a further step, an input tensor including the temporal sequence of data of the first sensor system is generated for a trained neural network; on the basis of the input tensor, the neural network being configured and trained to identify at least one subregion of the surroundings, in order to improve the monitoring of the surroundings with the aid of a second sensor system. In a further step, a control signal for the second sensor system is generated with the aid of an output signal of the trained neural network, in order to improve the monitoring of the surroundings in the at least one subregion.

In neural networks, the signal at a connection of artificial neurons may be a real number, and the output of an artificial neuron is calculated, using a nonlinear function of the sum of its inputs. The connections of the artificial neurons typically have a weight, which adapts with progressive learning. The weight increases or decreases the strength of the signal at a connection. Artificial neurons may have a threshold, so that a signal is only outputted when the overall signal exceeds this threshold.

A plurality of artificial neurons are typically combined to form layers. Different layers possibly carry out different types of transformations for their inputs. Signals travel from the first layer, the input layer, to the last layer, the output layer, possibly after passing through the layers several times.

In principle, neural networks are made up of at least three layers of neurons: an input layer, an intermediate layer (hidden layer), and an output layer. This means that all neurons of the network are subdivided into layers; a neuron of one layer always being connected to all of the neurons of the next layer. The different layers, right down to the input layer, are made up of neurons, which are subject to a nonlinear activation function and are connected to the neurons of the next layer. A deep neural network may include many such intermediate layers.

Such neural networks must be trained for their specific task. In this context, each neuron of the corresponding architecture of the neural network receives, e.g., a random starting weight. The input data are then put into the network, and each neuron weights the input signal by its weight and passes the result on to the neurons of the next layer. The overall result is then provided at the output layer. The magnitude of the error may be calculated, as well as the contribution that each neuron makes to this error, in order to then change the weight of each neuron in the direction which minimizes the error. Recursive loops, repeated measurements of the error, and adjustment of the weights are then carried out, until the error is below a predefined limit.

For example, the method of the present invention may be carried out, using a passive sensor as a first sensor system and an active sensor as a second sensor system, which are connected either directly or via a processing unit. In this context, the first sensor system measures and processes the surroundings of the first sensor system. Using its data, a control signal may then be generated according to the method; the control signal being provided to the second sensor system, in order for it to identify subregions in the surroundings of the first sensor system in accordance with the control signal; the identification of the subregions by the second sensor system being able to improve the monitoring of the surroundings. For example, the control signal for the active sensor, that is, for the second sensor system, may force the second sensor system to determine a certain region of the surroundings of the first sensor system, such as an angle and/or a distance and/or an elevation, more accurately.

In this context, the control signal is not limited to accurately evaluating only regions, in which objects have been determined, but the control signal may force the second sensor system to evaluate suitable subregions or regions of the surroundings of the first sensor system more accurately, in order to arrive at a temporally earlier and/or more accurate identification and/or detection and/or determination of objects of the surroundings of the first sensor system.

In addition, the above-described method for monitoring the surroundings of the first sensor system renders it unnecessary to introduce expert knowledge into the method, since the corresponding knowledge may be learned in a data-driven manner with the aid of the neural network.

The use of the method of the present invention may advantageously result in increased robustness and performance during the monitoring of surroundings for relevant road users, such as vehicles, pedestrians, etc., without requiring expert knowledge. For, in the case of classical model-based control of the active sensor, expert knowledge would be necessary to identify potential for improvement and to control the second sensor system adequately.

In addition, an efficient and cost-effective overall system may advantageously be produced for the selected task, since the sensor system and the algorithms for detecting the relevant road users are optimized together.

Furthermore, application-specific detection of relevant objects and simple scalability of the method may result in an advantageous manner.

In other words, the method of the present invention allows the surroundings of the first sensor system to be evaluated in a directional manner, for example, supplemented by data of the second sensor system, after, for example, an object or a subregion of the surroundings has been determined, using data of the first sensor system, in order to evaluate the object and/or the subregion more accurately.

In this context, for example, a dimension and/or a position and/or a region and/or an angle and/or a distance and/or an elevation and/or a speed and/or a probable future location and/or a region having objects that have been determined in an uncertain manner, and/or an object dimension that has been determined with uncertainty, may be determined more accurately, using the second sensor system.

The control signal for the second sensor system may relate to spatial monitoring of the surroundings, and/or the control signal may also be constructed in a complex manner and relate to, for example, the lighting of the second sensor system, for example, of a video system. Thus, the control signal for the second sensor system may relate to all characteristics of the second sensor system, by the control of which the monitoring of the surroundings may be changed, using the second sensor system.

No detected objects are required for the method of monitoring surroundings of a first sensor system. On the contrary, features from the surroundings are extracted within the neural network; the features being used to derive a subregion from them for improved monitoring of the surroundings. These may include, inter alia, structural obstructions, such as buildings or vegetation, and/or a road topology and/or a course of a road, and/or objects such as vehicles and pedestrians. In particular, subregions may also be monitored more accurately, which do not include a detected object but possess a high probability that an object could appear there in the future.

Using the method according to the present invention for monitoring surroundings of the first sensor system, objects may be detected more rapidly and earlier, since subregions, in which no object was detected yet up to that point, are also monitored.

In addition, the method may be used on applications, which do not require object detection, such as semantic segmentation and/or detection of roadway boundaries and/or compensating for sensor degradation in a multi-sensor system.

Using the method of the present invention, the robustness and detection rate for relevant road users, such as vehicles, pedestrians, etc., and regulatory elements, such as boundary lines, traffic lanes, sidewalks, etc., may be increased. Furthermore, a small region of the surroundings may be monitored and processed by a controllable, second sensor system in a highly selective and highly accurate manner. In particular, in the case of small objects far apart, such as lost articles (lost cargo), in the case of partial obstruction, such as a pedestrian in back of a passenger car, or for locating possible obstacles, for precise detection of markers, such as posts, manhole covers, traffic lights, etc.

In addition, simpler protection of autonomous systems may be achieved by the method of the present invention through increased redundance already on the sensor-system level, since, for example, the controllable, second sensor system confirms or falsifies the measurement of the first sensor system. Consequently, this method may provide an economically favorable, overall sensor system made up of at least one first sensor system and a controllable, second sensor system having an improved overall performance.

In addition, the method of the present invention may also allow a sensor, in the form of a first sensor system measuring the entire surroundings slowly, to be combined with a sensor, in the form of a second sensor system measuring more rapidly in a smaller monitoring range of the surroundings.

According to one aspect of the present invention, the neural network is configured to process time series of data and/or to characterize a time-dependent state of the neural network. A neural network configured in such a manner is particularly suitable for the method described.

According to one aspect of the present invention, the neural network is a recurrent neural network. Neural networks, which, in contrast to other networks, are distinguished by connections of neurons of one layer to neurons of the same or of a preceding layer, are referred to as recurrent and/or feedback neural networks. A state vector, which is passed on from time step to time step and is possibly changed, is able to be produced by the feedback. The use of a recurrent neural network may allow the method to be trained for the generation of a corresponding control signal in a particularly suitable manner, since sensor data from previous time steps may be accessed by such a recurrent neural network for a current time step. This may allow the monitoring of surroundings of the first sensor system to be improved.

According to one aspect of the present invention, the input tensor of the neural network includes data of the second sensor system, in order to improve the monitoring of the surroundings of the first sensor system. The representation of the surroundings of the first sensor system may be advantageously improved, using the additional data of the second sensor system. In this context, the input tensor may include the data of the second sensor system from a current time step and/or a previous time step. The training of the neural network may be adapted in accordance with the specific time step, in which the data of the second sensor system are generated.

According to one aspect of the present invention, the input tensor of the neural network includes data of the second sensor system, from a time step preceding a current time step, in order to improve the monitoring of the surroundings of the first sensor system. In this manner, the control signal generated is advantageously based on, inter alia, the sensor data of the second sensor system, from the preceding time step, and may therefore improve the representation of the surroundings of the first sensor system for the neural network, using the data of the second sensor system.

According to one aspect of the present invention, the input tensor of the neural network includes data of the second sensor system, from a current time step, and the second sensor system is controlled by the generated control signal from a previous time step, in order to improve the monitoring of the surroundings of the first sensor system. The representation of the surroundings of the first sensor system may be advantageously improved, using the data of the second sensor system from the current time step, and using a control signal from a previous time step, since the data of the respective sensor systems are generated in the same time step and have, consequently, a higher degree of synchronism. The training of the neural network may be adapted in accordance with the specific time step, in which the data of the second sensor system are generated.

According to one aspect of the present invention, the neural network is configured and trained to generate an object list from the surroundings of the first sensor system. Using such an object list, the neural network may be trained in an advantageous manner, or the objects of the object list identified in this manner may also be made available to other active systems for monitoring the surroundings.

According to one aspect of the present invention, the first sensor system is a passive sensor system, and the second sensor system is an active sensor system. In this context, an active sensor system may be a sensor system, whose signal and/or whose generated data and/or whose characteristic of detection may be adapted selectively to a particular requirement of the detection and/or controlled, as a function of a control signal regarding monitoring of surroundings.

Such detection characteristics of the controllable sensor system may relate, in particular, to a position of an object in the monitoring range of the controllable sensor system, for example, a determination in selected subregions and/or limited distance ranges and/or ranges of elevation angle. However, it may also relate to measuring characteristics, such as high-sensitivity resolution, etc. Accordingly, a controllable sensor system may be an active sensor system.

Examples of controllable sensor systems include radar sensors, lidar sensors, infrared sensors, time-of-flight sensors, and optical sensors. In general, sensors may be used, which may be controlled by a controllable signal source acting upon the object and/or the surroundings, for example, thermographic sensors, which determine temperature changes that are controlled at a specific location of the object to be evaluated, by introducing eddy currents or other heat input. In general, for the controllable signal source brought in, the wavelength of the signal source may also be varied, e.g., in the range of 0.7 µm-1000 µm for an infrared source, or in the range of 300-1600 nm for a lidar sensor.

According to one aspect of the present invention, the volume of data of the second sensor system is reduced with the aid of the control signal.

Alternatively, or in addition, the evaluation of the object by the first sensor system may also be carried out by the controllable, second sensor system, by suitably changing the detection characteristics of the controllable, second sensor system; this change in the detection characteristics relating, in particular, to a spatial size of a determination range of the surroundings of the mobile platform. Such utilization of the control of the second sensor system may allow, for example, the quantity of sensor data to be reduced, in order to conserve computing time and bandwidth. An example of this is a video sensor, which, with regard to the control signal, only supplies a selected image detail instead of the entire image.

According to one aspect of the present invention, the data of the first sensor system include a steering angle of a mobile platform and/or geographic map data and/or a planned route and/or a category of a road and/or weather conditions.

Alternatively, or in addition, the first sensor system may also be an active sensor system, which is either used in accordance with a passive sensor system or is controlled, using another controlled variable, such as a steering-angle signal of a mobile platform and/or a localizing signal.

For controlling the second sensor system with the aid of map data, the first sensor system may be a localization sensor, which determines a position on a map and/or in a surrounding area. With the aid of the map data, features, as well as subregions, may be derived likewise for improved monitoring of the surroundings. An example of useful subregions derivable from that include the course of roads and, in particular, the exit point of the road. In the vicinity of the exit point, objects become visible for the first time. This is shown for a pair of examples in FIGS. 3A through 3D. The subregions, which are intended to be monitored more accurately, are highlighted by hatching.

Alternatively, or in addition, a single active sensor may be used as a second sensor system without utilizing the data of the second sensor system for generating a control signal, and also without providing any data from a first sensor system to the neural network as an input tensor. For generating the control signal, the input tensor for the neural network then includes, for example, available signals of a mobile platform, with the aid of which the trained neural network generates a control signal for the second sensor system either alone or jointly. Examples of such input data include: a steering angle of a mobile platform and/or map data and/or a course of a planned route for a mobile platform and/or a road category (city, expressway, . . . ) and/or weather conditions.

Alternatively, or in addition, the input tensor may include a plurality of time sequences of data of a plurality of first sensor systems.

Alternatively, or in addition, the first sensor system may generate a plurality of control signals, which are supplied to a plurality of active sensor systems.

According to one aspect of the present invention, the first sensor system is an optical camera system, and the second sensor system is a lidar sensor and/or a radar sensor and/or an ultrasonic sensor. An optical camera system may be an optical camera in the narrow sense, or a video system.

According to one aspect of the present invention, the first sensor system is the same sensor system as the second sensor system; and in a subsequent time step, the control signal from the sensor system is used for improved monitoring of the surroundings. Such a subsequent step may be, in each instance, the following time step.

According to this aspect of the present invention, the input data for the neural network may not include any data from a first sensor system, which means that the control of the second sensor system may be based, in particular, on the data of the second sensor system, which are generated in a time step preceding the current time step.

For example, an active lidar sensor may be operated alternately in an "active" and "passive" mode. In the "passive" mode, an overview of the scene of the surrounding area may be generated, by capturing the entire field of view of the second sensor system at low local resolution. In the next time step, small regions of the field of view may be measured highly accurately in the "active" mode, using the acquired data.

According to one aspect of the present invention, the control signal forces the second sensor system to monitor the subregion of the surroundings, in order to improve the monitoring of the surroundings of the first sensor system.

According to one aspect of the present invention, the input tensor of the neural network includes a steering angle of a mobile platform and/or geographic map data and/or a planned route and/or a category of a road and/or weather conditions and/or a current task of an autonomous system and/or a list of objects and/or regions, which are intended to be measured more accurately. In this context, examples of a current task of an autonomous system may include: a driving task, such as parking and/or avoiding an obstacle, etc.

According to an example embodiment of the present invention, a method for training a neural network to generate a control signal for a second sensor system is provided; the method including the following steps: In one step, an input tensor for the neural network, including a temporal sequence of data of a first sensor system, is provided for monitoring surroundings of the first sensor system; the input tensor of the neural network including data of a second sensor system, from a time step preceding a current time step. In a further step, at least one object of the surroundings of the first sensor system is generated with the aid of the neural network and the input tensor. In a further step, a control signal is generated with the aid of the neural network and the input tensor. In a further step, the at least one object generated is compared to at least one correspondingly associated reference object. In a further step, data of a second sensor system are generated on the basis of the control signal for a next time step. In a further step, the neural network is adapted, in order to minimize, during the evaluation of the object of the surroundings, a deviation from the respective reference object.

For the method of training a neural network, the neural network may be configured to process time series of data and/or to characterize a time-dependent state of the neural network.

Alternatively, or in addition, the neural network may be a recurrent neural network for the method of training.

Reference objects are objects, which are generated, in particular, specially for the training of a neural network, together with the corresponding input data for the neural network, and which are labeled correspondingly.

According to one aspect of the present invention, it is provided that for the training of the neural network, the at least one object and the correspondingly associated reference object be, in each instance, an object list including at least one object of the surroundings of the first sensor system, and/or that the at least one object and the correspondingly associated reference object be, in each instance, a high-resolution representation of the surroundings of the first sensor system. Such a high-resolution representation of the surroundings may be, for example, an optically generated image of the surroundings and/or a representation, which is generated with the aid of a lidar system.

According to one aspect of the present invention, the at least one object of the object list is generated with the aid of an object detector, in order to train the neural network.

In other words, the training of the neural network and, in particular, of the recurrent neural network, may be carried out, using a separate object detector, in that the neural network is trained to generate the control signal and the at least one object, for example, of an object list, is generated by the object detector on the basis of, for example, the data of the first sensor system. By generating the at least one object, the object detector renders possible the necessary feedback for the learning of the control signal by the neural network; the object detector itself either being able to remain unchanged or being able to be incorporated into the training of the neural network.

According to one aspect of the present invention, it is provided that for the training of the neural network, the temporal sequence of data of the first sensor system be data of an actual, first sensor system or simulated data for the first sensor system.

In particular, data for the second sensor system should be provided for the training of the neural network and, in particular, of the recurrent neural network, using annotated data, since these data are generated as a function of the control signal of the second sensor system. Consequently, the second sensor system supplies data, which are substantially a function of its control. Thus, it is not possible to collect data for the second sensor system, which may be used subsequently in unchanged form for the training of a neural network.

In addition, the sensor data for the first and the second sensor systems must be annotated. As is customary in object detection, each relevant object is annotated, using a delimiting box and further attributes, such as an object type and/or a speed, etc.

According to an example embodiment of the present invention during the training, the neural network is adapted with the aid of a loss function, which describes the optimization target. Such a loss function may have at least two parts. A first part may be a common loss function (multi-task loss) from the area of object detection; the common loss function including a regression and classification part.

During the adaptation of the neural network, for example, objects may be compared to annotated data (ground truth). A second part of the loss function may formulate further optimization targets on the basis of the control signal. An example of this is the minimization of the number of data points of a lidar system, in order to achieve, for example, a cost reduction for the specific sensor system.

According to an example embodiment of the present invention, the neural network may be adapted and trained with the aid of backpropagation. By using the above-described loss function, the neural network learns, for example, to detect relevant objects during training. Since the control signal for the second sensor system may have a large influence on how effectively objects may be detected, the neural network will change the control signal in such a manner, that the objects are detected in the best manner possible.

In addition to the above-described methods for training the neural network, further, conventional methods from the area of machine learning may be used for the training. Some of these methods include:
  deep learning
  reinforcement learning active learning unsupervised/semi-supervised learning According to one aspect of the present invention, it is provided that for the training of the neural network, the data of the second sensor system be generated with the aid of a high-resolution sensor system and/or the data of the second sensor system be generated with the aid of a simulation program for simulating the second sensor system and/or the data of the second sensor system be generated by the second sensor system, in the surroundings of the first sensor system. In other words, for the training of the neural network, both the data of the first sensor system and the data of the second sensor system may be generated with the aid of a simulation program.

Alternatively, or in addition, for the training of the neural network, the data of the second sensor system may be generated, using data of a high-resolution sensor system, in that data, which correspond to a second sensor system, are generated from data of a high-resolution sensor system as a function of the control signal. For example, the data, which correspond to at least a subregion of the surroundings, could be selected from the data of a high-resolution sensor system on the basis of the sensor system. Alternatively, or in addition, for the training of the neural network, data, which have a lower resolution, could be selected from the data of the high-resolution sensor system as a function of the control signal. The high-resolution sensor would be used in accordance with this aspect, in order to generate and store high-resolution data, which are selected for the training in accordance with the control signal, in order to simulate data of a second sensor system.

Alternatively, or in addition, the training of the neural network by data from sensor measurements of the real world may take place, by using data of the second sensor system directly. Required reference data, including annotated objects and/or high-resolution sensor data, could be generated simultaneously for the training, with the aid of a reference system.

The neural network may also be trained without annotated data, by using a reconstruction loss as a minimizing target function. Consequently, it is possible to learn the control signal for the second sensor system, since from the point of view of information theory, such a reconstruction loss includes the most valuable data. For example, learning may take place in such a manner, that a building, which has already been measured, does not have to be measured again in the next time step, since it will not move or change. However, a pedestrian is measured more accurately in each time step, since he/she is able to move and changes his/her appearance, which is not simple to predict. To that end, a structure of the neural network is adapted, in order to deliver high-resolution sensor data instead of an object list, at the output. The loss function may compare the output signal of the neural network to high-resolution sensor data for the second sensor system, for example, from a simulation, and may, with the aid of a metric, determine how well the data agree. Inter alia, the sum of the absolute differences may be used as a metric. In this manner, the neural network learns to configure the control signal, so that high-resolution sensor data may be generated from past data and from the sensor data of the first sensor system and/or of the second sensor system, which have low resolution.

According to one aspect of the present invention, for the training of the neural network, the neural network is configured to process time series of data and/or to characterize a time-dependent state of the neural network, and/or the neural network is a recurrent neural network.

According to an example embodiment of the present invention, a neural network is provided, which is configured and trained in accordance with one of the above-described methods for training the neural network.

According to an example embodiment of the present invention, a method corresponding to one of the methods described above for monitoring surroundings of a first sensor system is provided; the first sensor system including a neural network, which is configured and trained according to one of the methods described above for training the neural network.

According to an example embodiment of the present invention, a monitoring device is provided, which is configured to execute one of the methods described above for monitoring surroundings of a first sensor system.

According to an example embodiment of the present invention, a mobile platform is provided, which is at least semiautomated and includes one of the monitoring devices described above for monitoring the surroundings of the mobile platform; and/or the mobile platform including a first sensor system and a second sensor system, as is described above. In this manner, the monitoring of the surroundings of the mobile platform may be carried out at a low amount of financial expenditure, with a high level of quality of the monitoring.

A mobile platform may be understood as an at least semiautomated system that is mobile, and/or as a driver assistance system. One example may be an at least semiautomated vehicle, that is, a vehicle having a driver assistance system. That is to say, in this connection, an at least semiautomated system includes a mobile platform with regard to an at least semiautomated functionality, but a mobile platform also includes vehicles and other mobile machines having driver assistance systems. Further examples of mobile platforms may include driver assistance systems having a plurality of sensors, and mobile multisensor robots, such as robot vacuum cleaners or lawn mowers.

The described method of the present invention for monitoring surroundings of a first sensor system may be used for mobile platforms and/or also for multisensor monitoring systems and/or a production machine and/or a personal assistant and/or an access control system. Each of these systems may be a fully automated or semiautomated system.

According to an example embodiment of the present invention, a computer program is provided, which includes commands that, in response to the execution of the computer program by a computer, cause it to carry out one of the methods described above. With the aid of such a computer program, the methods described above may be made available in a simple manner to, for example, a mobile platform.

According to an example embodiment of the present invention, a machine-readable storage medium is provided, in which the computer program described above is stored. With the aid of such a machine-readable storage medium, the computer program product described above is transportable.

According to an example embodiment of the present invention, a use of the control signal, as described above, is provided for controlling an external sensor system. Consequently, the control system may be used, alternatively or additionally, for control for the second system and/or for a further, external sensor system.

According to an example embodiment of the present invention, a use of one of the above-described methods of monitoring surroundings of a first sensor system is provided for controlling an at least semiautomated mobile platform.

According to an example embodiment of the present invention, a method is provided, in which, on the basis of surroundings of a first sensor system monitored in accordance with one of the above-described methods, a control signal for controlling an at least semiautomated vehicle is generated; and/or in which, on the basis of the monitored surroundings of the first sensor system, a warning signal for warning a vehicle occupant is generated.

BRIEF DESCRIPTION OF THE DRAWINGS

An exemplary embodiment of the present invention is represented with reference to FIGS. 1 through 8 and explained in greater detail below.

FIG. 4 shows method steps for monitoring surroundings, according to an example embodiment of the present invention.

FIG. 5 shows a monitoring device, including data flows;

FIGS. 8A-8D show possible applications of the method, according to example embodiments of the present invention.

DETAILED DESCRIPTION OF EXAMPLE EMBODIMENTS

Figure 1:
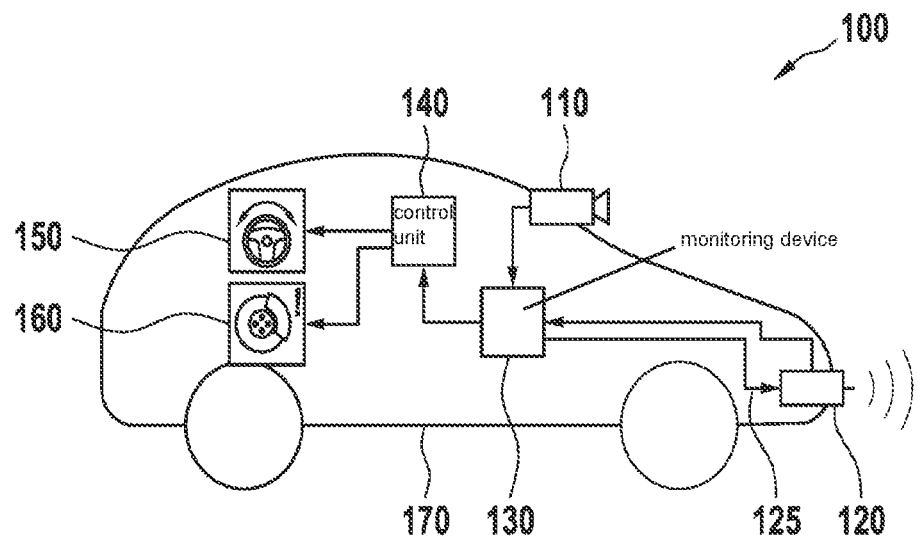
FIG. 1 shows a mobile platform having different types of sensors, including at least one controllable sensor, according to an example embodiment of the present invention.

FIG. 1 schematically shows a vehicle 170, which includes a system 100 for monitoring surroundings of a mobile platform. Vehicle 170 includes a video camera 110, which corresponds to a first sensor system, and which is coupled to a monitoring device 130 for signal transmission, in order to supply images generated by it to monitoring device 130. A controllable radar sensor 120 of vehicle 170, which corresponds to a second sensor system, is coupled to monitoring device 130 for bidirectional signal transmission and supplies its signals to monitoring device 130. In this context, with regard to its sensing of the surroundings, controllable radar sensor 120 may be controlled by a generated control signal.

Using such a system, selective control of an active, second sensor system 120, such as a radar or lidar sensor, is possible with the aid of a control signal, which means that directional monitoring of the surroundings may take place. In this context, with the aid of connection signal 125, which transmits signals from control unit 130 to second sensor system 120, the control signal may be transmitted to second sensor system 120.

Monitoring device 130 is configured to execute one of the above-described methods for monitoring the surroundings, using the data of video camera 110 and the radar sensor. In addition, the monitoring device may be coupled to a control unit 140, which is coupled, for example, to a brake 160 or a steering system 150. In this manner, as a function of signals from monitoring device 130, control unit 140 may, for example, control automatic emergency braking or control an automatic evasive maneuver with the aid of the steering system.

Figure 2A:
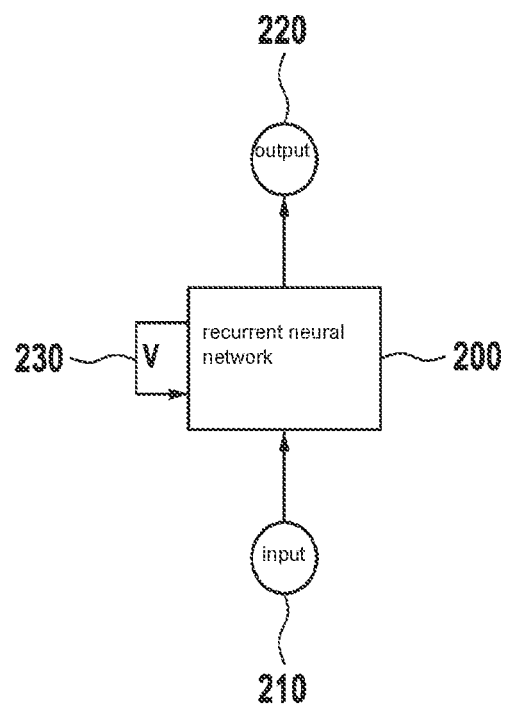
FIGS. 2A and 2B show a recurrent neural network, according to example embodiments of the present invention.

FIG. 2A outlines a structure of a recurrent neural network (RNN) 200 having an input connection 210, at which the input tensor may be made available, and an output 220, at which, for example, a control signal and/or an object list as described above may be made available. In this context, the recurrent structure of the neural network is indicated by state variable V 230 and the arrow.

Figure 2B:
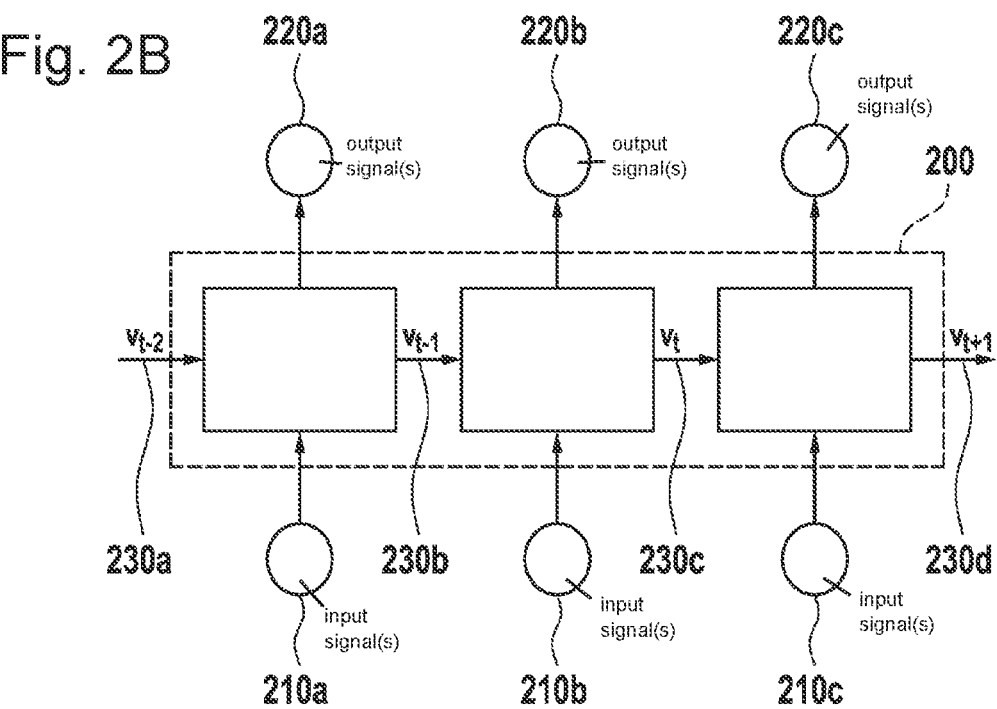
Figure 3A:
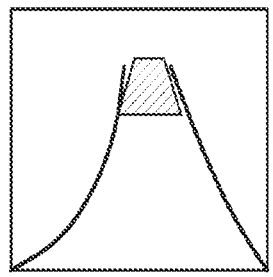
FIGS. 3A-3D show highlighted regions of different traffic situations.
Figure 3C:
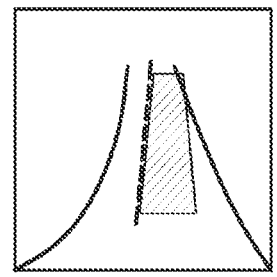
Figure 3B:
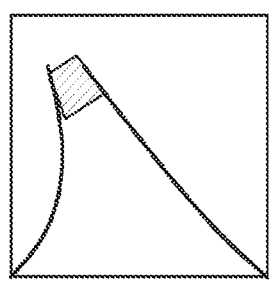
Figure 3D:
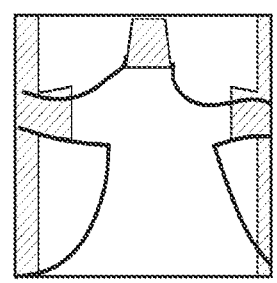

FIG. 2B outlines the structure of recurrent neural network 200, in which the recurrent structure is represented by an "unrolled" recurrent neural network. Temporal sequences of data of the first sensor system may be made available, for example, at input connections 210 $a$ through $c$ at time steps t−1, t, t+1; corresponding output signals $220a$ through $220c$ being generated by the neural network from the time sequences of data of the first sensor system. The respective, previous state of recurrent neural network 200 may be used, in each instance, via a state vector $V_{t-2}$, $V_{t-1}$, $V_t$, $V_{t+1}$, to characterize the current state of recurrent neural network 200. In this instance, the neural network itself remains unchanged in the method for monitoring surroundings of a first sensor system. In other words, at time t, input data $x_t$ and the state vector of a previous time step $V_{t-1}$ are processed by neural network 200. In this context, output $220a$ through $220c$ and a new state $V_t$ are generated. In the next time step t+1, state $V_{t+1}$ is used, in turn, as an input variable for the neural network.

FIG. 3A through 3D outline four different road scenes and/or traffic situations, in which subregions are highlighted by the hatched fields; the subregions being able to be monitored, for example, by the second sensor system with the aid of the control signal, in order to improve the monitoring of the surroundings of the first sensor system, as already explained further up. FIG. 4 outlines method steps for monitoring the surroundings of first sensor system 510:

In a step S1, which is prior to a current time step, data, which are provided for generating the input tensor, are generated by a second sensor system 520.

In a further step S2, a temporal sequence of data of first sensor system 510 for monitoring the surroundings is made available in a current time step; the data encompassing, for example, a large region of the surroundings.

In a further step S3, an input tensor including the temporal sequence of data of first sensor system 510 and the supplied data of second sensor system 520 is generated for a trained neural network; the neural network being configured and trained to identify, on the basis of the input tensor, at least one subregion of the surroundings, in order to improve the monitoring of the surroundings with the aid of a second sensor system.

In a further step S4, a control signal 540 for second sensor system 520 is generated with the aid of an output signal of trained neural network 200, in order to improve the monitoring of the surroundings in the at least one subregion. To that end, neural network 200 may extract internal features, such as instances of concealment and/or a course of a road and/or objects, and optionally output them as an object list 530, as well. These extracted features may be used internally in neural network 200, in order to determine regions, such as angles and/or distances, which should be measured more accurately. In these regions, there is a high probability that new objects become visible or objects already detected may be monitored more accurately. Consequently, neural network 200 may generate the appropriate control signal for second sensor system 520 as a function of these regions.

In a further step S5, the control signal forces second sensor system 520 to monitor the subregion of the surroundings, in order to improve the monitoring of the surroundings of first sensor system 510. With the aid of this control signal 540, the second sensor system may modify its monitoring range, for example. Accordingly, second sensor system 520 may then generate data for such regions, which have an increased level of accuracy, and via which the surroundings of the first sensor system may be monitored in an improved manner.

FIG. 5 outlines data flows during operation of a monitoring device for monitoring surroundings of a first sensor system 510, including three representations of the monitoring device situated side-by-side; a previous time step being situated on the far left 501, a current time step being situated in the middle 502, and a future time step being situated on the right. The specific details of the monitoring device are only shown in the middle representation of the monitoring device. In this context, the monitoring device includes a trained, recurrent neural network 200.

First sensor system 510 may be, for example, a passive video sensor and/or a lidar sensor system, and second sensor system 520 may be an actively controllable lidar sensor system. These sensor systems supply sensor data periodically. In this instance, data of first sensor system 510 are intended to be used for controlling second sensor system 520 in such a manner, that appropriate regions in the surroundings of first sensor system 510 may be monitored more precisely. In this manner, for example, relevant road users may be detected earlier and more reliably, and/or a number of ghost objects may be reduced.

At time t, the neural network 200 trained by deep learning is provided input signals 210$b$ including data of first sensor system 510. The same applies to a previous time t−1, using input data 210$a$, and to the following time t+1, using input data 210$c$. In addition, trained neural network 200 is provided sensor data $c_{t-1}$ 540$a$ of second sensor system 520 from a previous time t−1, as well as a state vector of the neural network $d_{t-1}$ 230$b$ from a previous time t−1, and consequently, an input tensor is generated.

State vector $d_{t-1}$ 230$b$ constitutes a state vector of the neural network from time t−1, with the aid of which neural network 200 may store data over time steps.

In addition, the input tensor may include even more data 210$b$, such as a vehicle speed and/or a vehicle steering angle, etc.

On the basis of the input data described, as well as its learned logic, neural network 200 generates a control signal $b_t$ 540 for second sensor system 520 and a list of detected objects $a_t$ 530, such as a list of detected, relevant road users, which are characterized by their position and/or dimensions and/or orientation and/or object type. For this, neural network 200 aggregates data of sensor systems 510, 520 over previous time steps. The particularly accurate estimation with the aid of the object list $a_t$ of relevant road users may be used subsequently for controlling a mobile platform, such as a vehicle.

Signal $b_t$ may include information, such as angular or distance ranges, which the active, controllable, second sensor system is intended to measure. With the aid of control signal $b_t$ 540, monitoring of the surroundings of first sensor system 510 by second sensor system 520 is controlled in a subsequent, future time step t+1. To that end, data $c_t$ 540$b$ of second sensor system 520 and state vector $d_t$ 230$c$ of neural network 200 at time t may be provided for the next time step t+1.

Figure 6:
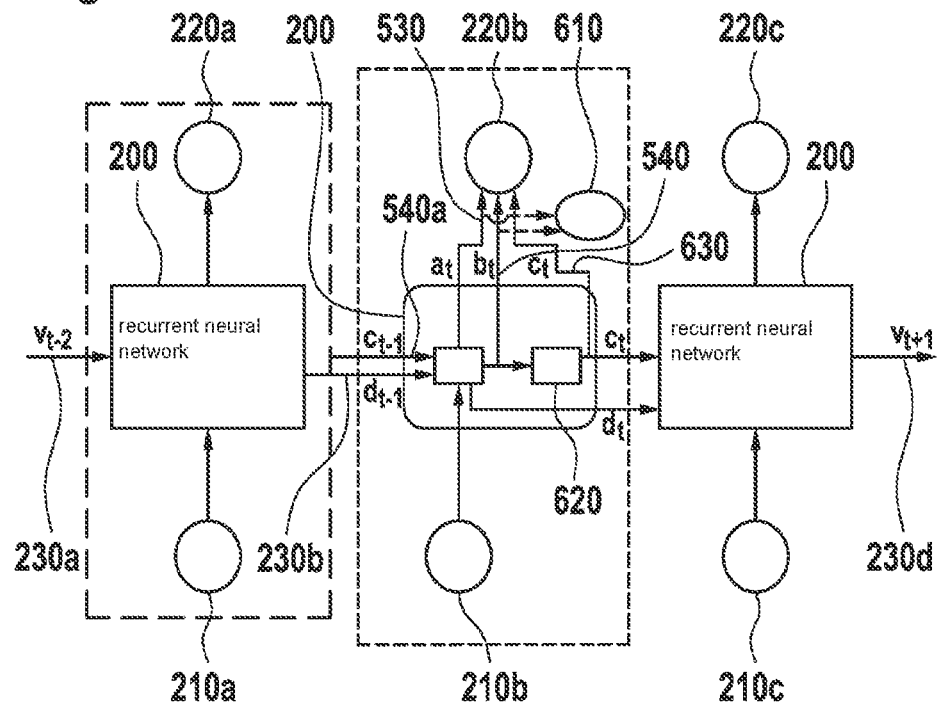
FIG. 6 shows data flows during the training of a monitoring device, according to an example embodiment of the present invention.

FIG. 6 outlines data flows during the training of a monitoring device for monitoring surroundings of a first sensor system. In addition to the data flows, which were already described in accordance with the monitoring device, described in FIG. 5, for monitoring surroundings of a first sensor system 510, in FIG. 6, the data flows from object list $a_t$ 530 and from control signal $b_t$ 540 to loss function 610 are shown, in order to be able to carry out, with the aid of reference objects that are not shown here, a comparison of the at least one object generated by neural network 200 with a correspondingly associated reference object, as described above.

In order to generate data of second sensor system 520 of FIG. 5 as a function of control signal bt 540, in FIG. 6, a simulation program 620 is provided in place of a second sensor system 520. The method steps of the sequence of the training of neural network 200 have already been described further up.

Figure 7:
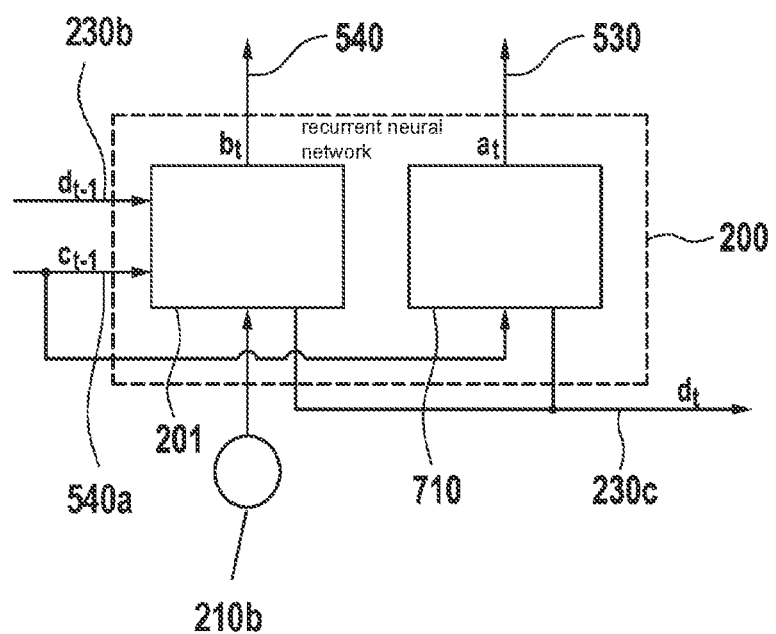
FIG. 7 shows a modified set-up for training a monitoring device, according to an example embodiment of the present invention.

FIG. 7 outlines the data flows, using a modified set-up of the neural network, during the training of a neural network 200 for monitoring the surroundings of the first sensor system. During this training of neural network 200, neural network 200 is trained, with the aid of a separate object detector 710, to generate a control signal for the second sensor system. In this context, both neural network 201 and object detector 710 receive sensor data $c_{t-1}$ 540$a$ of second sensor system 520 from a previous time t−1. In this manner, neural network 200 learns to generate control signal $b_t$ 540, and detector 710 generates the at least one object of object list $a_t$ 530 on the basis of the data of second sensor system 520. Consequently, detector 710 regulates the feedback for the training of the neural network to generate control signal $b_t$ 540, by providing the at least one object of object list at, and may remain unchanged itself or may be optimized, as well. The specific state of object detector 710, which is characterized, for example, by an object list $a_t$ 530, may be used in the next time step t+1 as an input variable for neural network 201 in accordance with state vector $d_t$ 230$c$. Alternatively, or in addition, input signal 210$b$ may be provided as an input variable for neural network 201 and object detector 710. In other words, neural network 200 is divided up into a neural network 201 for generating control signal $b_t$ 540, and into object detector 710.

FIGS. 8A through 8D outline further possible fields of application of one of the methods described.

FIG. 8A outlines the use of one of the described methods in automated inspection systems, such as for inspection of components by thermography, eddy current, and conventional optics, in order to sort out defective components reliably.

FIG. 8B outlines the use of one of the described methods for an automated lawn mower, e.g., for reliable determination and/or classification of objects, in this context, in particular, the distinguishing of an obstacle from a non-obstacle.

FIG. 8C outlines the use of one of the described methods for automatic access control, e.g., for optical and acoustic identification of persons and automatic opening of doors.

FIG. 8D outlines the use of one of the described methods for monitoring spaces or buildings, e.g., for inspecting dangerous goods, using, for example, a camera and a lidar sensor.

What is claimed is:

1. A method for monitoring surroundings of a first sensor system, comprising the following steps:
providing a temporal sequence of data of the first sensor system for monitoring the surroundings;
generating an input tensor including the temporal sequence of data of the first sensor system, for a trained neural network, the neural network being configured and trained to identify, based on the input tensor, at least one subregion of the surroundings, to improve the monitoring of the surroundings using a second sensor system;

generating a control signal for the second sensor system, using an output signal of the trained neural network, to improve the monitoring of the surroundings in the at least one subregion using the second sensor system.

2. The method as recited in claim 1, wherein the neural network is configured to process time series of data and/or to characterize a time-dependent state of the neural network.

3. The method as recited in claim 1, wherein the input tensor of the neural network includes data of the second sensor system, from a time step preceding a current time step, in order to improve the monitoring of the surroundings of the first sensor system.

4. The method as recited in claim 1, wherein the first sensor system is a passive sensor system, and the second sensor system is an active sensor system.

5. The method as recited in claim 1, wherein the first sensor system is the same sensor system as the second sensor system, and in a subsequent time step, the control signal is used by the sensor system for the improved monitoring of the surroundings.

6. The method as recited in claim 1, wherein the control signal forces the second sensor system to monitor the subregion of the surroundings, to improve the monitoring of the surroundings of the first sensor system.

7. The method as recited in claim 1, wherein the neural network is trained by:
providing an input tensor for the neural network, including a second temporal sequence of data of the first sensor system for monitoring surroundings of the first sensor system, the input tensor of the neural network including data of the second sensor system from a time step preceding a current time step;
generating at least one object of the surroundings of the first sensor system using the neural network and the input tensor;
generating a control signal using the neural network and the input tensor;
comparing the generated at least one object to at least one correspondingly associated reference object;
generating data of the second sensor system based on the control signal, for a next time step; and
adapting the neural network to minimize, during the determination of the object of the surroundings, a deviation from the correspondingly associated reference object.

8. A method for training a neural network to generate a control signal for a second sensor system, comprising the following steps:
providing an input tensor for the neural network, including a temporal sequence of data of a first sensor system for monitoring surroundings of the first sensor system, the input tensor of the neural network including data of a second sensor system, from a time step preceding a current time step;
generating at least one object of the surroundings of the first sensor system using the neural network and the input tensor;
generating a control signal using the neural network and the input tensor;
comparing the generated at least one object to at least one correspondingly associated reference object;
generating data of the second sensor system based on the control signal, for a next time step; and
adapting the neural network to minimize, during the determination of the object of the surroundings, a deviation from the correspondingly associated reference object.

9. The method as recited in claim 8, wherein the at least one object and the correspondingly associated reference object are, in each instance, an object list including at least one object of the surroundings of the first sensor system, and/or the at least one object and the correspondingly associated reference object are, in each instance, a high-resolution representation of the surroundings of the first sensor system.

10. The method as recited in claim 8, wherein the at least one object of the object list is generated using an object detector.

11. The method as recited in claim 8, wherein the temporal sequence of data of the first sensor system are data of an actual, first sensor system or simulated data for the first sensor system.

12. The method as recited in claim 8, wherein the data of the second sensor system are generated using a high-resolution sensor system, and/or the data of the second sensor system are generated using a simulation program for simulating the second sensor system, and/or the data of the second sensor system are generated by the second sensor system in the surroundings of the first sensor system.

13. The method as recited in claim 8, wherein the neural network is configured to process time series of data and/or to characterize a time-dependent state of the neural network, and/or the neural network is a recurrent neural network.

14. A neural network configured and trained to generate a control signal for a second sensor system, the neural network being trained by:
providing an input tensor for the neural network, including a temporal sequence of data of a first sensor system for monitoring surroundings of the first sensor system, the input tensor of the neural network including data of a second sensor system, from a time step preceding a current time step;
generating at least one object of the surroundings of the first sensor system using the neural network and the input tensor;
generating a control signal using the neural network and the input tensor;
comparing the generated at least one object to at least one correspondingly associated reference object;
generating data of the second sensor system based on the control signal, for a next time step; and
adapting the neural network to minimize, during the determination of the object of the surroundings, a deviation from the correspondingly associated reference object.

15. A monitoring device configured to monitor surroundings of a first sensor system, the monitoring device configured to:
provide a temporal sequence of data of the first sensor system for monitoring the surroundings;
generate an input tensor including the temporal sequence of data of the first sensor system, for a trained neural network, the neural network being configured and trained to identify, based on the input tensor, at least one subregion of the surroundings, to improve the monitoring of the surroundings using a second sensor system; and
generate a control signal for the second sensor system, using an output signal of the trained neural network, to improve the monitoring of the surroundings in the at least one subregion using the second sensor system.

\* \* \* \* \*